(12) United States Patent
Goda

(10) Patent No.: US 11,379,589 B2
(45) Date of Patent: Jul. 5, 2022

(54) INFORMATION PROCESSING APPARATUS AND METHOD OF CONTROLLING THE SAME

(71) Applicant: CANON KABUSHIKI KAISHA, Tokyo (JP)

(72) Inventor: Junichi Goda, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 16/833,776

(22) Filed: Mar. 30, 2020

(65) Prior Publication Data

US 2020/0311279 A1    Oct. 1, 2020

(30) Foreign Application Priority Data

Apr. 1, 2019 (JP) .............................. JP2019-070038

(51) Int. Cl.
*G06F 21/57* (2013.01)
*G06F 21/60* (2013.01)

(52) U.S. Cl.
CPC .......... *G06F 21/575* (2013.01); *G06F 21/572* (2013.01); *G06F 21/608* (2013.01)

(58) Field of Classification Search
CPC ..... G06F 21/575; G06F 21/572; G06F 21/608
See application file for complete search history.

(56) References Cited

U.S. PATENT DOCUMENTS

| | | | | |
|---|---|---|---|---|
| 2006/0179302 A1* | 8/2006 | Hatakeyama | ........... | G06F 21/51 |
| | | | | 713/164 |
| 2009/0222653 A1* | 9/2009 | Findeisen | ............... | G06F 21/72 |
| | | | | 713/2 |
| 2012/0198224 A1* | 8/2012 | Leclercq | ................. | H04L 9/088 |
| | | | | 713/2 |
| 2017/0180137 A1* | 6/2017 | Spanier | ................... | G06F 8/654 |
| 2017/0255384 A1* | 9/2017 | Hashimoto | ............. | G06F 3/061 |
| 2018/0157841 A1* | 6/2018 | Shin | ........................ | G06F 21/44 |
| 2018/0365406 A1* | 12/2018 | Elnekaveh | ............ | H04L 9/0819 |
| 2019/0230240 A1* | 7/2019 | Umimura | .............. | G06F 3/1217 |
| 2020/0151336 A1* | 5/2020 | Maletsky | .............. | G06F 21/572 |
| 2020/0334360 A1* | 10/2020 | Inaba | ................. | G05B 19/0426 |
| 2020/0387612 A1* | 12/2020 | Fan | ......................... | G06F 21/64 |
| 2021/0073397 A1* | 3/2021 | Schramm | .............. | G06F 21/602 |
| 2021/0334378 A1* | 10/2021 | Kennedy | ................. | G06F 21/76 |

FOREIGN PATENT DOCUMENTS

JP         2014021953 A        2/2014

\* cited by examiner

*Primary Examiner* — Zahid Choudhury
(74) *Attorney, Agent, or Firm* — Venable LLP

(57) ABSTRACT

An information processing apparatus having at least a first controller and a second controller. The second controller includes a CPU and a first storage for storing, in a non-volatile manner, a first program to be executed by the CPU. When the information processing apparatus is started up, the first controller verifies a presence or absence of alteration of the first program stored in the first storage, and causes the CPU to start up after confirming by the verification that the first program has not been altered.

16 Claims, 7 Drawing Sheets

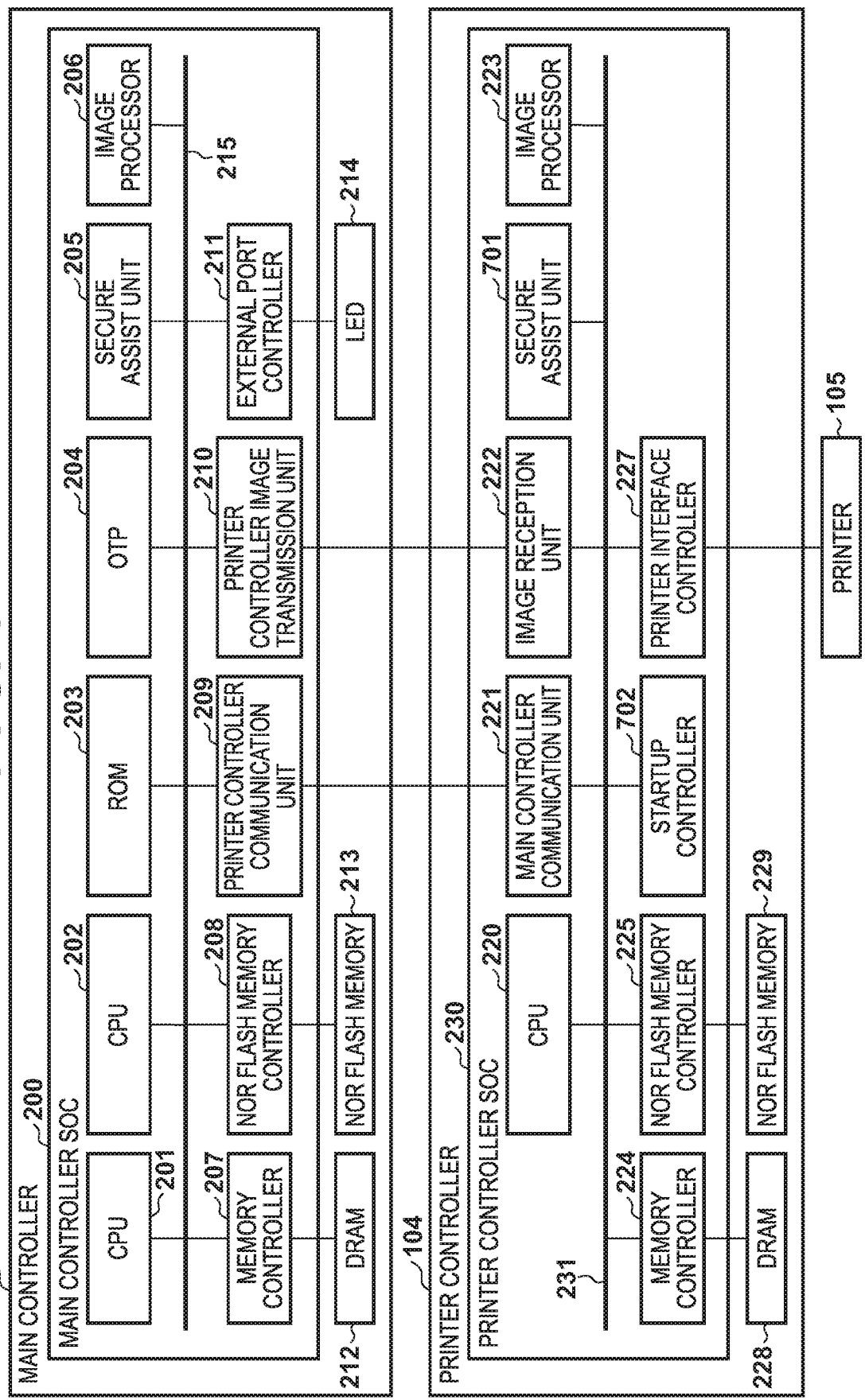

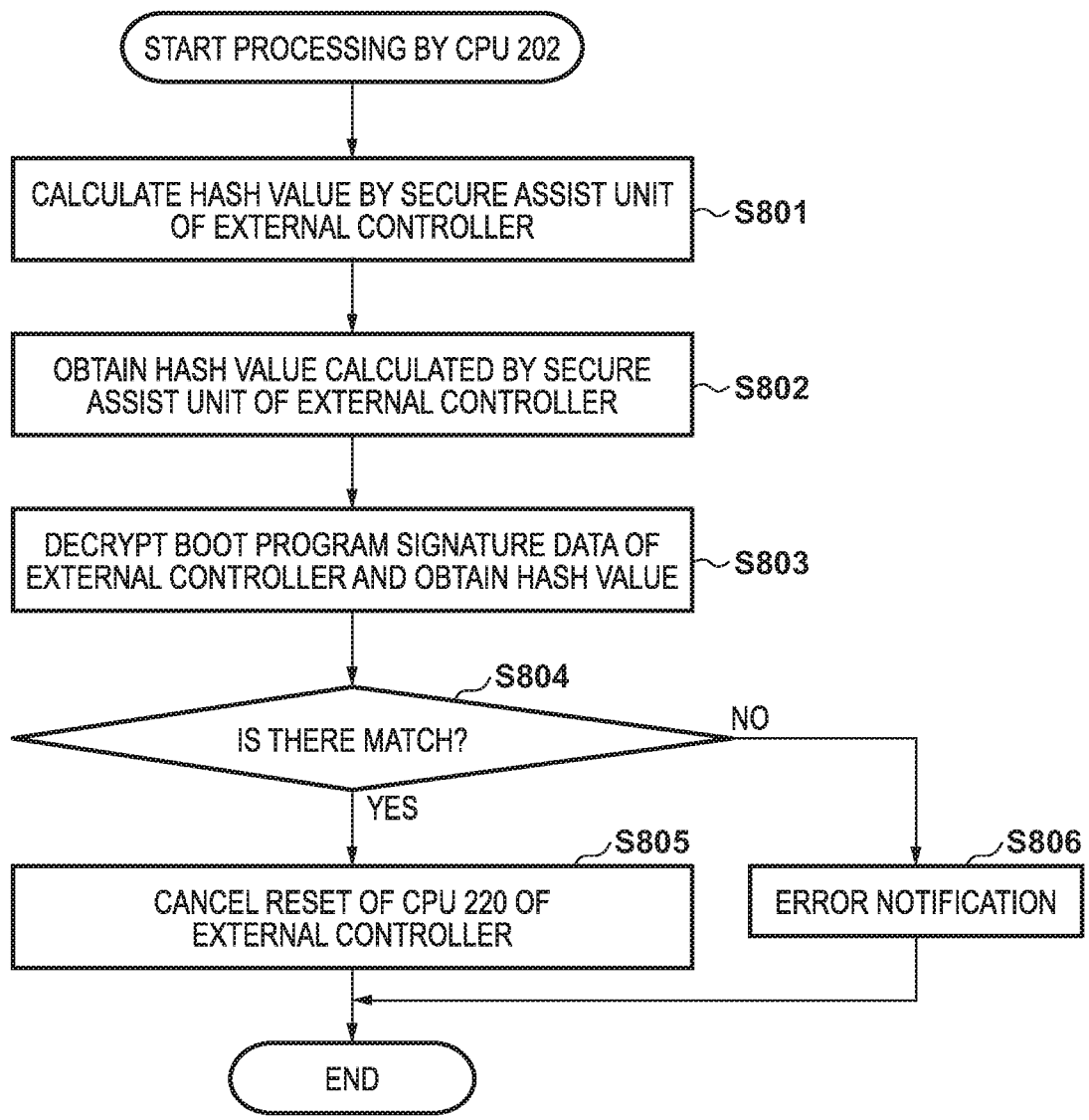

INFORMATION PROCESSING APPARATUS AND METHOD OF CONTROLLING THE SAME

BACKGROUND OF THE INVENTION

Field of the Invention

The present invention relates to an information processing apparatus and a method of controlling the same.

Description of the Related Art

With respect to vulnerabilities of information devices, attacks to exploit the information devices by altering firmware have become problematic. As a countermeasure against such attacks, a secure boot using a digital signature (hereinafter, referred to as a signature) of a boot program is known. Secure boot is a technique in which a boot loader verifies signatures and confirms their validity prior to starting the boot program, thereby causing a trusted boot program to operate on the device. A boot loader that performs verification of signatures (hereinafter, referred to as signature verification) is usually stored in difficult-to-rewrite hardware or the like. The boot loader is defined as a trust base point (Root of Trust, hereinafter, RoT), and the boot program trusted by the RoT sequentially verifies and starts up the OS (operating system) and the application program in a similar manner. This makes it possible to connect all the programs that operates on the information device with a chain of trust.

The signatures of the respective programs are generated in advance using the hash values of the programs and the signature keys according to cryptographic algorithms such as RSA and DSA (Digital Signature Algorithm)/ECDSA (Elliptic Curve Digital Signature Algorithm), and are stored together with the programs in a non-volatile memory. At a time of signature verification, verification processing according to the above-described cryptographic algorithm is performed using a program, a signature, and a verification key. By such signature verification, it is possible to confirm whether or not a program has been altered, and then start the program if it is confirmed that the program is not altered.

Japanese Patent Laid-Open No. 2014-21953 discloses a method in which a single controller has a plurality of CPUs and operation programs of respective CPUs, and the plurality of CPUs share a TPM (Trusted Platform Module) which is a module for providing a single alteration detection function, and perform signature verification of each operation program.

In a system in which a plurality of controllers each having a CPU and a program for operating the CPU are connected, if all the controllers have an alteration detection function, the cost increases. Further, when the controllers do not each have an alteration detection function, if a controller lacking an alteration detection function boots up, there is a possibility that it will undergo an attack for exploiting an information device.

SUMMARY OF THE INVENTION

An aspect of the present invention is to eliminate the above-mentioned problem with conventional technology.

A feature of the present invention is to provide a technique of, in an information processing apparatus having a plurality of controllers, enabling safe start up of a controller having no alteration detection function by performing alteration detection on a program of a controller having no program alteration detection function.

According to a first aspect of the present invention, there is provided an information processing apparatus having at least a first controller and a second controller, wherein the second controller includes a CPU and a first storage for storing, in a non-volatile manner, a first program to be executed by the CPU, when the information processing apparatus is started up, the first controller verifies a presence or absence of alteration of the first program stored in the first storage, and causes the CPU to start up after confirming by the verification that the first program has not been altered.

According to a second aspect of the present invention, there is provided an information processing apparatus having at least a first controller and a second controller, wherein the second controller comprises: a CPU, a first storage configured to store, in a non-volatile manner, a first program that is executed by the CPU, and an obtaining unit configured to obtain a hash value of the first program stored in the first storage, wherein, when the information processing apparatus is started up, the first controller verifies a presence or absence of alteration of the first program based on the hash value obtained by the obtaining unit, and causes the CPU to start up after confirming by the verification that the first program has not been altered.

According to a third aspect of the present invention, there is provided an information processing apparatus having a first controller comprising a first CPU and a first communication hardware module, and a second controller comprising a second CPU and a second communication hardware module, wherein when the information processing apparatus is started up, the first controller verifies a boot program of the second CPU, and the second CPU executes the boot program which is confirmed to be valid by the verification, and the first communication hardware module communicates the boot program of the second CPU to second the communication hardware module before the second CPU executes the boot program.

According to a fourth aspect of the present invention, there is provided a method of controlling an information processing apparatus comprising at least a first controller and a second controller having a CPU and a first storage operable to store a first program to be executed by the CPU in a non-volatile manner, wherein when the information processing apparatus is started up, the first controller verifies a presence or absence of alteration of the first program stored in the first storage, and the first controller causes the CPU to start up after confirming by the verification that the first program has not been altered.

According to a fifth aspect of the present invention, there is provided a method of controlling an information processing apparatus comprising at least a first controller and a second controller having a CPU and a first storage operable to store a first program to be executed by the CPU in a non-volatile manner, wherein when the information processing apparatus is started up, the second controller obtains a hash value of the first program stored in the first storage, the first controller verifies whether or not the first program has been altered based on the obtained hash value, and the first controller causes the CPU to start up after confirming that the first program has not been altered in accordance with the verification.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a block diagram for describing a hardware configuration of a main controller and a printer controller of a multifunction peripheral according to a second embodiment.

FIG. 8 is a flowchart for describing a process when the CPU 202 of the multifunction peripheral according to the second embodiment executes the boot program of the NOR flash memory.

DESCRIPTION OF THE EMBODIMENTS

Figure 1:
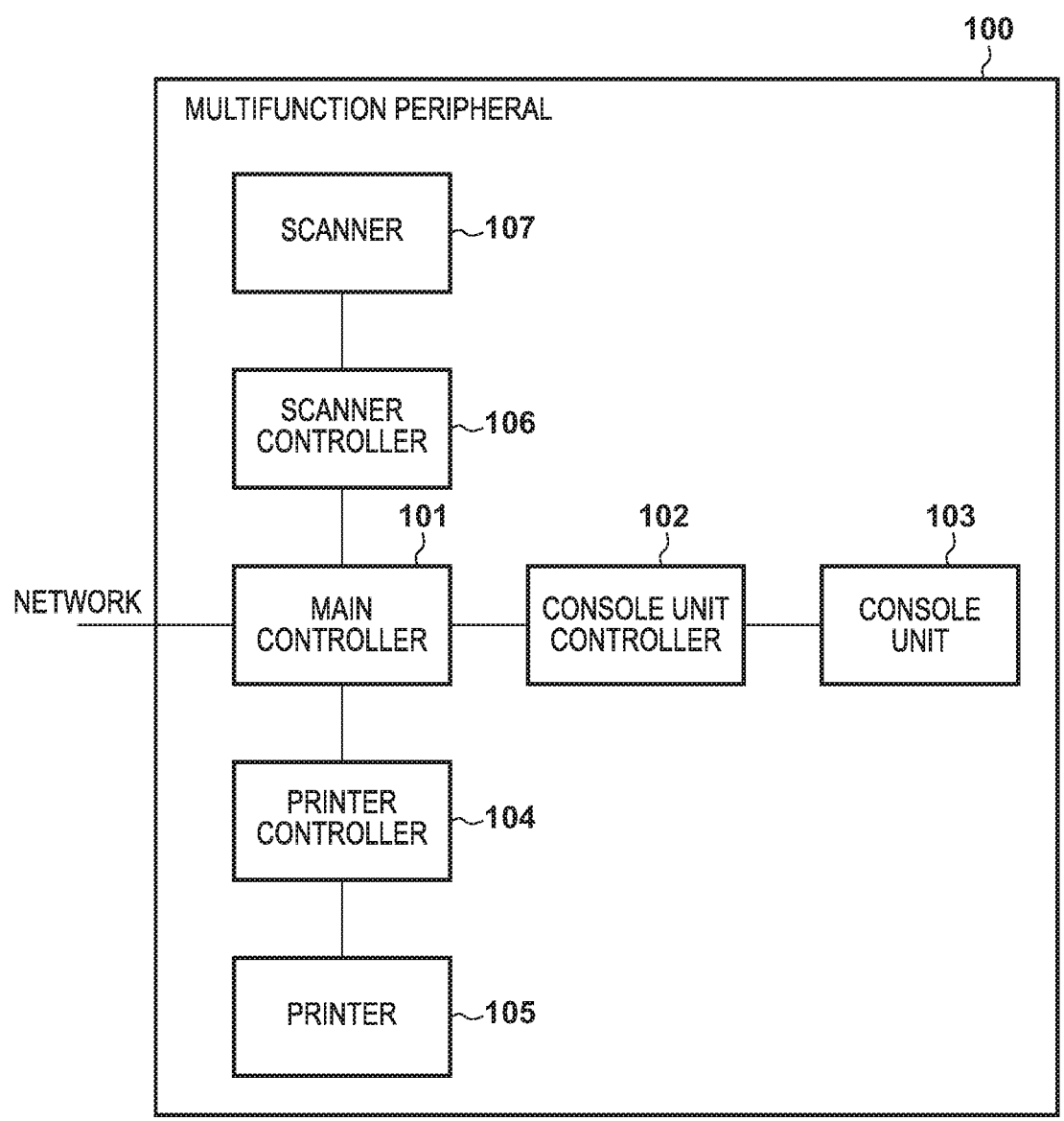
FIG. 1 is a block diagram for describing a hardware configuration of a multifunction peripheral according to a first embodiment of the present invention.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

Furthermore, in the accompanying drawings, the same reference numerals are assigned to the same or similar components, and a repetitive description thereof is omitted. A multifunction peripheral (digital multifunction peripheral/ MFP: Multi Function Peripheral) will be described as an example of an information processing apparatus according to the embodiments. However, an application range is not limited to the multifunction peripheral, and may be any information processing apparatus.

First Embodiment

FIG. 1 is a block diagram for describing a hardware configuration of a multifunction peripheral 100 according to a first embodiment of the present invention.

A main controller 101 is a controller for controlling and managing the entirety of the multifunction peripheral 100. A scanner controller 106, a printer controller 104, and a console unit controller 102, which will be described later, can communicate with each other, and image data can also be transferred therebetween. For example, an instruction based on a user operation made via a console unit 103 is received from the console unit controller 102. Further, communication with each controller is performed, and execution is performed for a job such as a copy job in which, for example, scanned image data obtained by a scanner 107 is subjected to image processing, transferred to a printer 105, and printed.

The scanner controller 106 controls the scanner 107 and controls communication between the scanner 107 and the main controller 101. Image data obtained by the scanner 107 is subjected to image processing and transmitted to the main controller 101. The printer controller 104 controls the printer 105 and controls communication between the printer 105 and the main controller 101. The printer controller 104 performs image processing on image data received from the main controller 101, and transmits the processed image data to the printer 105 for printing. The console unit controller 102 controls the console unit 103 and controls communication between the console unit 103 and the main controller 101. The console unit controller 102 also transmits display information received from the main controller 101 to the console unit 103, and causes the console unit 103 to execute screen display with respect to a user. In the first embodiment, the main controller 101, the scanner controller 106, the printer controller 104, and the console unit controller 102 each have a CPU and a control program for the CPU to control the respective controller.

Figure 2:
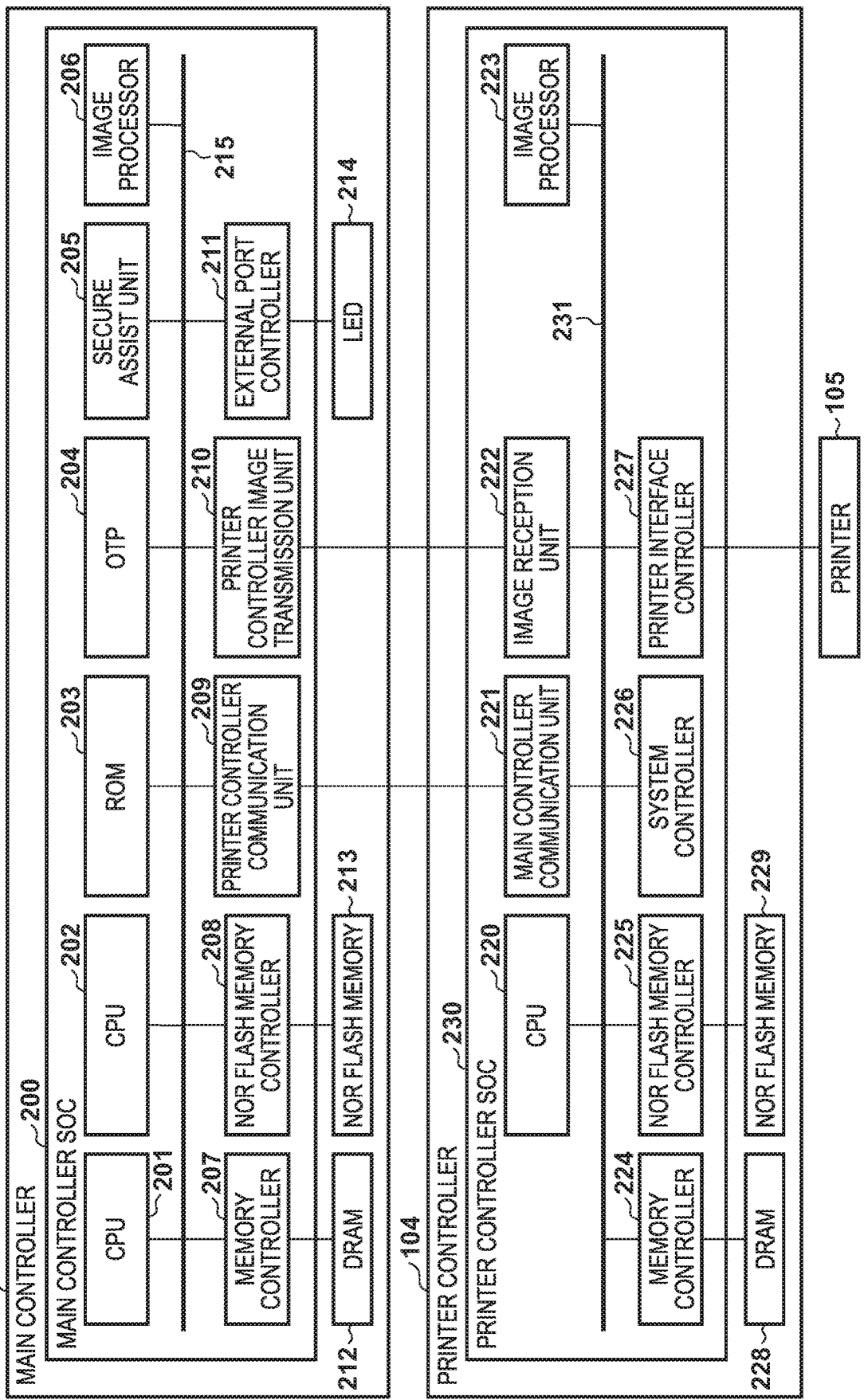
FIG. 2 is a block diagram for describing a hardware configuration of a main controller and a printer controller of the multifunction peripheral according to the first embodiment.

FIG. 2 is a block diagram for describing a hardware configuration of the main controller 101 and the printer controller 104 of the multifunction peripheral 100 according to the first embodiment.

Figure 3:
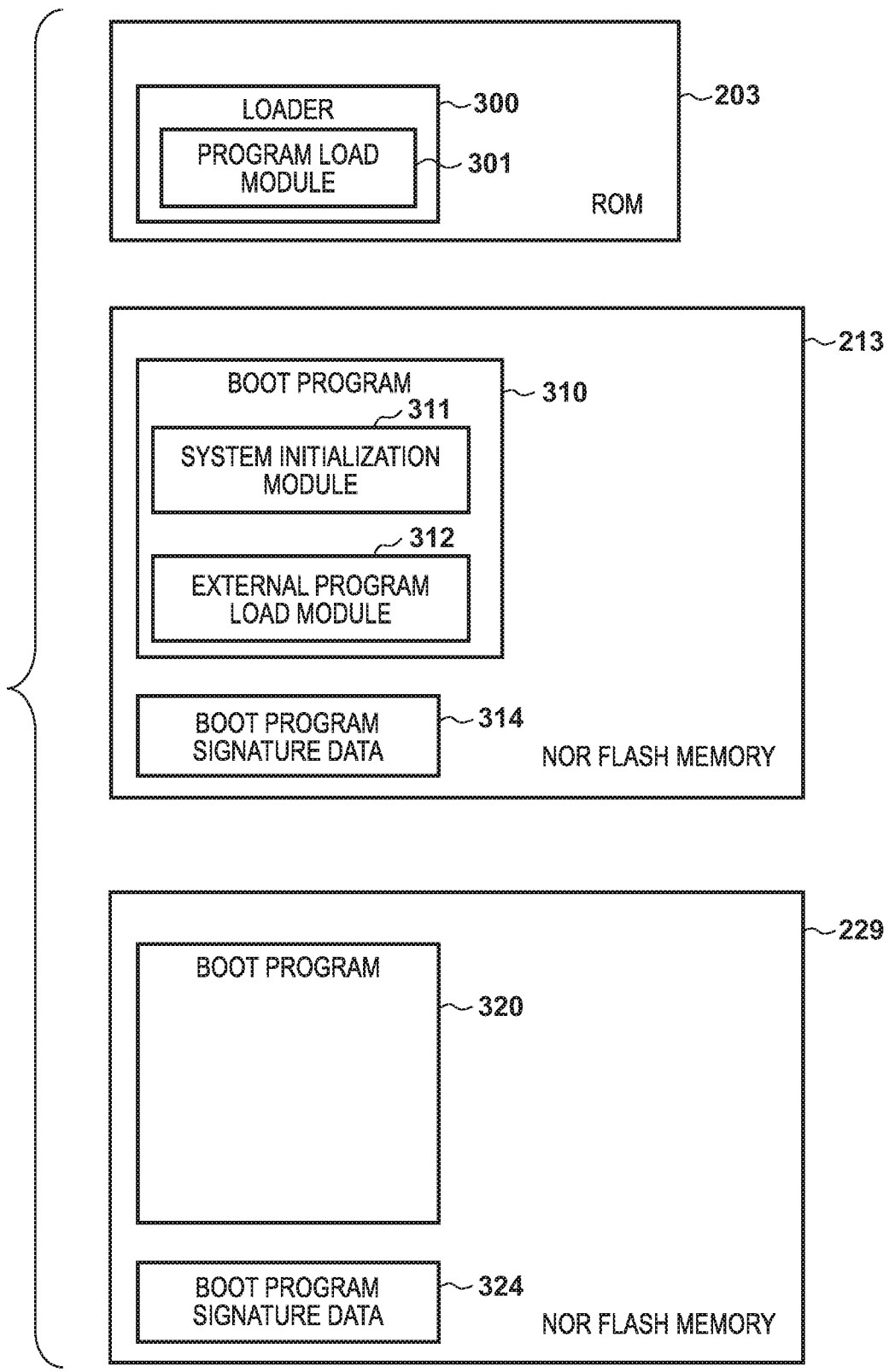
FIG. 3 is a block diagram for describing software modules held by the multifunction peripheral according to the first embodiment.

A main controller SOC (system on chip) 200 is a module for controlling the main controller 101. In the first embodiment, description is given assuming that the main controller SOC 200 is configured as a semiconductor chip. A ROM 203 is a mask ROM and stores a loader 300 (FIG. 3) executed by a CPU 201. A NOR flash memory 213 stores a boot program 310 (FIG. 3), which is executed by a CPU 202, and corresponding boot program signature data 314 (FIG. 3). The CPU 201 and the CPU 202 can access the NOR flash memory 213 via a NOR flash memory controller 208.

The CPU 201 verifies the signature of the boot program 310 stored in the NOR flash memory 213 and cancels a reset of the CPU 202. The CPU 202 executes the boot program 310 for which not being altered has been determined, to start up and control the main controller 101. In the first embodiment, the CPU 201 performs signature verification of a boot program 320 (FIG. 3) stored in a NOR flash memory 229 of the printer controller 104, and also cancels a reset of a CPU 220 of a printer controller SOC 230.

An OTP (One Time Programmable) ROM (hereinafter, referred to as OTP) 204 is a ROM that can be written only once at the time of manufacturing, and holds a verification key for verifying a signature of a boot program. The verification key is a key capable of decrypting signature data of a boot program encrypted with a signature key, which will be described later. A secure assist unit 205 has a hardware assist function for calculating a hash value of program.

In the first embodiment, the secure assist unit 205 reads out a boot program stored in the NOR flash memory 213 or the NOR flash memory 229, and calculates a hash value of the boot program. The secure assist unit 205 also has a function of decrypting, with the verification key stored in the OTP 204, data encrypted with the signature key. In the first embodiment, this verification key is used to decrypt the boot program signature data 314 and boot program signature data 324 (FIG. 3).

An image processor 206 performs shading processing on image data received from the scanner controller 106 and halftoning processing for output to the printer controller 104. A memory controller 207 controls various commands for accessing a DRAM 212. The DRAM 212 is used by programs executed by the CPU 202 and as a work memory of the image processor 206. A printer controller communication unit 209 is a communication hardware module that performs communication control for communicating with the printer controller 104. In the first embodiment, the CPU 202 can also access the hardware modules of the printer controller SOC 230 (e.g., a NOR flash memory controller 225 and a memory controller 224) via the printer controller communication unit 209. A printer controller image transmission unit 210 transfers halftone image data processed by the image processor 206 to the printer controller 104. An external port controller 211 is a general-purpose input/output port, and, for example, controls an output port to turn on an LED 214 as required, thereby conveying a software/hardware abnormality to the outside. A system bus 215 interconnects the above-described components. Each of the above-described units transmits and receives various data, control commands, and the like via the system bus 215.

Next, the printer controller 104 will be described.

The printer controller SOC 230 is a module for controlling the printer controller 104, and in the first embodiment, is described as being configured as a semiconductor chip. The NOR flash memory 229 stores a boot program 320, which is executed by the CPU 220, and corresponding the boot program signature data 324 (FIG. 3). The CPU 220 can access the NOR flash memory 229 via the NOR flash memory controller 225. A main controller communication unit 221 is a communication hardware module for communicating with the main controller 101. The main controller communication unit 221 is physically connected to the printer controller communication unit 209 by a communication line. As described later, the boot program 320 for the CPU 220 is transmitted between the printer controller communication unit 209 and the main controller communication unit 221 through the communication line when the multifunction peripheral 100 is started and prior to the CPU 220 executing the boot program 320. Prior to the CPU 220 executing the boot program 320, the printer controller communication unit 209 executes communication for the boot program 320 with the main controller communication unit 221. An image reception unit 222 receives halftone image data inputted from the main controller 101. An image processor 223 performs image processing such as a fine scaling process or PWM processing for outputting halftone image data received from the main controller 101 to the printer 105. A printer interface controller 227 performs communication control for the CPU 220 to control the printer 105, and transfers image data processed by the image processor 223 to the printer 105. The memory controller 224 controls various commands for accessing a DRAM 228. The DRAM 228 is used by programs executed by the CPU 220 and as a work memory of the image processor 223.

When the power of the printer controller 104 is turned on and started up, a system controller 226 executes only minimum start processing that the printer controller SOC 230 requires. The minimum required start processing in the first embodiment is to enable operation of only the main controller communication unit 221, the NOR flash memory controller 225, the NOR flash memory 229, and a system bus 231 which is for realizing communication between the modules. This start processing is controlled only by a hardware sequencer. The system controller 226 is capable of clock-control and reset-control of the printer controller SOC 230 via the CPU 220 or the main controller communication unit 221. The system bus 231 interconnects the above-described components. Each of the above-described units transmits and receives various data, control commands, and the like via the system bus 231.

FIG. 3 is a block diagram for describing software modules held by the multifunction peripheral 100 according to the first embodiment.

The loader 300 is a program that is executed by the CPU 201 when the power of the multifunction peripheral 100 is turned on, and is stored in the ROM 203. The loader 300 includes a program load module 301, and cancels resetting of the CPU 202 after signature verification of the boot program 310 using the verification key stored in the OTP 204 and the boot program signature data 314. Details of the processing of the program load module 301 will be described later with reference to the flowchart of FIG. 4.

The boot program 310 is a program executed by the CPU 202 after the signature verification by the loader 300, and is stored in the NOR flash memory 213. The boot program signature data 314 is digital signature data of the boot program 310, and is calculated from the signature key and the hash value of the boot program 310. Here, RSA, DSA, or ECDSA is used as an algorithm for generating and verifying signature data. A system initialization module 311 performs various initializations of the memory controller 207, the printer controller communication unit 209, and the like. An external program load module 312 performs signature verification of the boot program 320 stored in the NOR flash memory 213 of the printer controller 104 by using the verification key stored in the OTP 204 and the boot program signature data 324, and then cancels a reset of the CPU 220. Details of the processing of the external program load module 312 will be described later with reference to the flow chart of FIG. 5.

The boot program 320 is a program executed by the CPU 220 of the printer controller 104 after signature verification by the boot program 310, and is stored in the NOR flash memory 229. The boot program signature data 324 is digital signature data of the boot program 320, and is calculated from the signature key and the hash value of the boot program 320. Here, RSA, DSA, or ECDSA is used as an algorithm for generating and verifying signature data.

Figure 4:
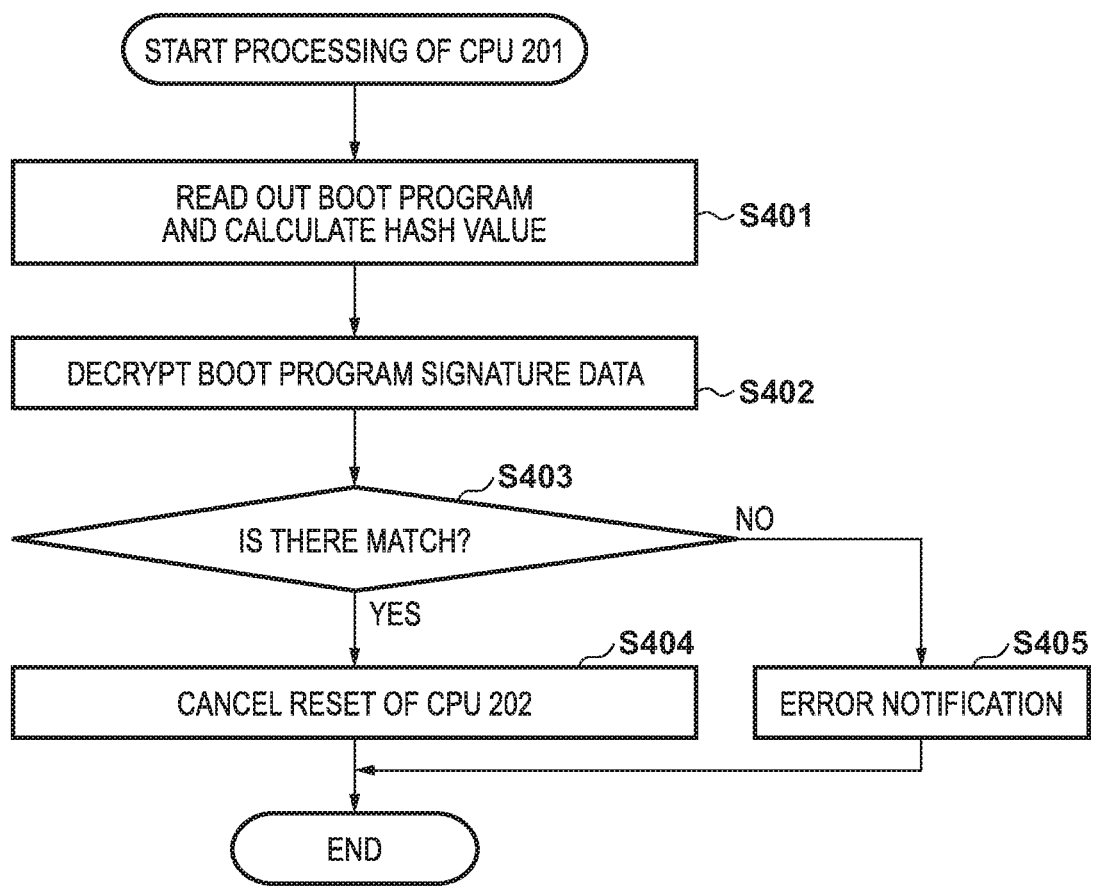
FIG. 4 is a flowchart for describing a process when a CPU 201 of the multifunction peripheral according to the first embodiment executes signature verification of a boot program stored in a NOR flash memory.

FIG. 4 is a flowchart for describing a process in which the CPU 201 of the multifunction peripheral 100 according to the first embodiment executes the program load module 301 and executes the signature verification of the boot program 310 stored in the NOR flash memory 213. The processing illustrated in this flowchart is started when the power of the multifunction peripheral 100 is turned on and a reset of the main controller 101 is canceled.

First, in step S401, the CPU 201 uses the secure assist unit 205, reads out the boot program 310 from the NOR flash memory 213, and causes a hash value of the boot program 310 to be calculated. Next, the process proceeds to step S402, and the CPU 201 uses the secure assist unit 205, reads out the boot program signature data 314 from the NOR flash memory 213, and uses a verification key stored in the OTP 204 to decrypt the boot program signature data 314 and obtain the hash value of the boot program 310. Then, the process proceeds to step S403, the CPU 201 verifies whether or not the hash value obtained by calculation in step S401 matches the hash value obtained by decryption in step S402, that is, whether or not there is alteration of the boot program 310. When it is determined here that the values match, since the boot program 310 is not altered, that is, the verification result is valid, the process proceeds to step S404, and a reset of the CPU 202 of the main controller 101 is cancelled. As a result, the CPU 202 reads out the boot program 310, which is safe and has not been altered, from the NOR flash memory 213, and starts the process.

In contrast, in step S403 if the hash value obtained by the calculation in step S401 does not match the hash value obtained by decrypting the boot program signature data 314 in step S402, it is determined that the boot program 310 has been altered, and the process proceeds to step S405. In step S405, the CPU 201 performs an error notification. For example, processing for causing the LED 214 to blink to warn a user is performed, and the process is terminated.

Figure 5:
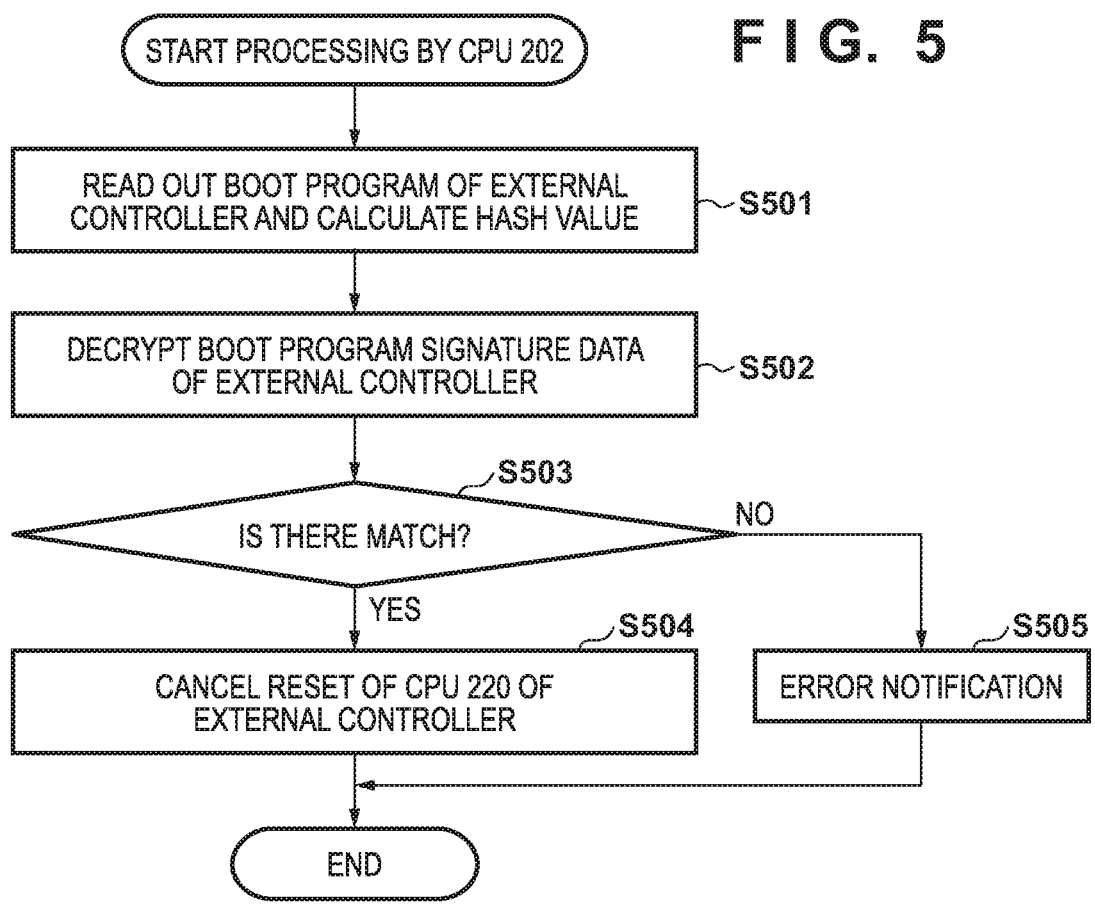
FIG. 5 is a flowchart for describing a process when the CPU 202 of the multifunction peripheral according to the first embodiment executes the boot program of the NOR flash memory.

FIG. 5 is a flowchart for describing a process when the CPU 202 of the multifunction peripheral 100 according to the first embodiment executes the boot program of the NOR flash memory 213. Processing illustrated in this flowchart is started after the reset of the CPU 202 is canceled in step S404 of FIG. 4, the CPU 202 executes the system initialization module 311, and initialization is performed so that the main controller 101 is capable of all operations.

The flowchart illustrating this processing is substantially the same as the processing when CPU 201 executes the loader described with reference to FIG. 4. Differences are that the boot program to be verified and a readout destination of boot program signature data is the printer controller 104, which is an external controller, and that the CPU whose reset is to be cancelled after not being altered is confirmed is the CPU 220 of the printer controller 104. Description is given in detail below.

First, in step S501, the CPU 202 uses the secure assist unit 205, and reads out the boot program 320 from the NOR flash memory 229 of the printer controller 104, and causes a hash value of the boot program 320 to be calculated. Next, the process proceeds to step S502, and the CPU 202 uses the secure assist unit 205, reads out the boot program signature data 324 from the NOR flash memory 229, and uses a verification key stored in the OTP 204 to decrypt the boot program signature data 324 and obtains the hash value of the boot program 320. Then, the process proceeds to step S503, the CPU 202 determines whether or not the hash value obtained by calculation in step S501 matches the hash value obtained by decryption in step S502, and if they match, determines that the boot program 320 of the NOR flash memory 229 has not been altered, and the process proceeds to step S504. In step S504, the CPU 202 cancels the reset of the CPU 220 of the printer controller 104. When the reset of the CPU 220 is canceled in this manner, the CPU 220 reads out the boot program 320, which is safe and has not been altered, from the NOR flash memory 229 and starts processing.

In contrast if it is determined in step S503 that the hash value obtained by the calculation in step S501 does not match the hash value obtained by decryption in step S502, the CPU 202 determines that the boot program 320 of the NOR flash memory 229 has been altered, and the process proceeds to step S505. In step S505, the CPU 202 performs an error notification. For example, processing for causing the LED 214 to blink to warn a user is performed, and the process is terminated.

Figure 6:
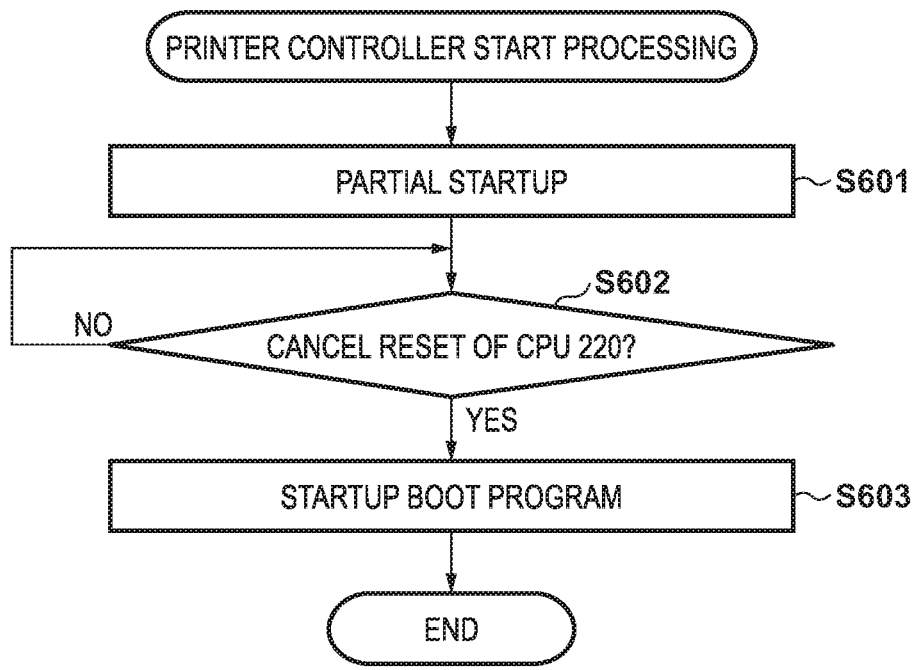
FIG. 6 is a flowchart for describing processing to start a printer controller of the multifunction peripheral according to the first embodiment.

FIG. 6 is a flowchart for describing processing to start the printer controller 104 of the multifunction peripheral 100 according to the first embodiment.

In step S601, when the power of the printer controller 104 is turned on, the system controller 226 causes the startup of only the main controller communication unit 221, the NOR flash memory controller 225, the NOR flash memory 229, and the system bus 231 for realizing communication between the modules. Next, the process proceeds to step S602, and waits for the reset of the CPU 220 to be canceled in step S504 of FIG. 5 described above. Before the reset of the CPU 220 is canceled, the external program load module 312 of the main controller 101 is verifying whether or not the boot program 320 of the printer controller 104 has been altered. If it is verified that the boot program 320 has not been altered, the reset of the CPU 220 is canceled in step S602, and the program proceeds to step S603. In step S603, the CPU 220 reads out the boot program 320 of the NOR flash memory 229 and starts the boot program 320. Note that, if the reset of the CPU 220 is not canceled in step S602, the boot program 320 is in a state of having been altered and the processing of step S603 is not proceeded to.

As described above, according to the first embodiment, before the first controller (e.g., printer controller) having no alteration detection function is started up, the second controller (e.g., main controller) having the alteration detection function executes alteration detection of programs of the first controller. As a result, it is possible to safely start the first controller that does not have an alteration detection function.

In the first embodiment, the first controller having no alteration detection function has been described by taking the printer controller 104 as an example, but there is no limitation to the printer controller, and the first controller may be, for example, the scanner controller 106 or another controller. As described above, the main controller SOC 200 has a similar communication unit for communicating with the scanner controller 106 and the console unit controller 102. The scanner controller 106 and the console unit controller 102 have a communication unit for communication with a main controller and a NOR flash memory that stores programs for controlling the CPU and the respective controllers, similarly to the printer controller 104. Therefore, with a method similar to that in the first embodiment, the main controller SOC 200 can perform alteration detection of the scanner controller 106 and the console unit controller 102 which do not have an alteration detection function.

In the first embodiment, a boot program is described as an example of a program to be subjected to alteration detection, but the present invention is applicable to all programs that control a respective controller and are not limited to a boot program.

Second Embodiment

In the first embodiment described above, the secure assist unit 205 of the main controller 101 reads out the boot program 320 of the NOR flash memory 229 of the printer controller 104, and verifies whether the boot program 320 has been altered. The readout time of the boot program 320 varies greatly in accordance with the data transfer performance of the printer controller communication unit 209 and the main controller communication unit 221. For example, when a serial communication interface is employed to reduce the number of I/O pins of the main controller SOC 200 and the printer controller SOC 230, or when a low-speed communication interface that is not a costly high-speed serial communication interface is used, the transfer time is particularly long. In other words, in order for the multifunction peripheral 100 to start up safely, it is necessary to confirm whether all the programs of each external controller storing a program are not altered, and not only the main controller 101, and it is assumed that a lot of time is required for the transfer of the programs of each controller. As a result, there is a possibility that the startup time of the multifunction peripheral 100 may be prolonged. Therefore, in the second embodiment, an example will be described in which the time required for program transfer is shortened by providing a secure assist unit in an external controller, thereby shortening the startup time of the multifunction peripheral 100.

FIG. 7 is a block diagram for describing a hardware configuration of the printer controller 104 and the main controller 101 according to the second embodiment, and illustrates portions in common with FIG. 2 described above with the same reference numerals, with description of these portions in common omitted.

The printer controller SOC 230 according to the second embodiment includes a secure assist unit 701 having a function equivalent to that of the secure assist unit 205 according to the first embodiment. Further, in the printer controller SOC 230 according to the second embodiment, there is the addition of a startup controller 702 for the printer controller SOC 230 to execute minimum required start processing, which was executed by the system controller 226 according to the first embodiment.

FIG. 8 is a flowchart for describing a process when the CPU 202 of the multifunction peripheral 100 according to the second embodiment executes a boot program of the NOR flash memory 213. Processing illustrated in this flowchart operates after the reset of the CPU 202 is canceled in step S404 of FIG. 4, the CPU 202 executes the system initialization module 311, and initialization is performed so that the main controller 101 is capable of all operations.

In step S801, the CPU 202 reads out the boot program 320 from the NOR flash memory 229 of the printer controller 104 using the secure assist unit 701 of the printer controller SOC 230, and causes a hash value of the boot program 320 to be calculated. Next, the process proceeds to step S802, and the CPU 202 obtains the hash value calculated in step S801 from the secure assist unit 701 of the printer controller 104. Next, the process proceeds to step S803, and the CPU 202 uses the secure assist unit 701 to obtain the boot program signature data 324 from the NOR flash memory 229. The boot program signature data 324 is decrypted using the verification key to obtain the hash value of the boot program 320. Then, the process proceeds to step S804, the CPU 202 determines whether or not the hash value obtained in step S802 matches the hash value obtained by decryption in step S803, and if they match, determines that the boot program 320 of the NOR flash memory 229 has not been altered, and the process proceeds to step S805. In step S805, the CPU 202 cancels the reset of the CPU 220 of the printer controller 104. When the reset of the CPU 220 is canceled in this manner, the CPU 220 reads out the boot program 320, which is safe and has not been altered, from the NOR flash memory 229 and starts processing.

In contrast, if it is determined in step S804 that the hash value obtained in step S802 does not match the hash value obtained by decryption in step S803, the CPU 202 determines that the boot program 320 of the NOR flash memory 229 has been altered, and the process proceeds to step S806. In step S806, the CPU 202 performs an error notification. For example, processing for causing the LED 214 to blink to warn a user is performed, and the process is terminated.

As described above, according to the second embodiment, since the external controller (e.g., printer controller) has a mechanism for causing a hash value of the boot program to be calculated, it is possible to detect alteration without reading out all of the boot program from the main controller. That is, by the main controller reading out all the boot programs of external controllers, it is possible to reduce the transfer time of a program, and to shorten the time required for detecting alteration of the multifunction peripheral.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070038, filed Apr. 1, 2019, which is hereby incorporated by reference herein in its entirety.

What is claimed is:

1. An information processing apparatus having at least a first controller and a second controller, wherein the first controller comprises:
   a first CPU;
   a second CPU;
   a ROM configured to store, in a non-volatile manner, a boot program that is executed by the first CPU;
   a first storage configured to store, in a non-volatile manner, a first program that is executed by the second CPU;
   wherein the second controller includes a third CPU and a second storage for storing, in a non-volatile manner, a second program to be executed by the third CPU,
   wherein when the information processing apparatus is started up, the first CPU executes the boot program stored in the ROM to verify a presence or absence of alteration of the first program stored in the first storage, wherein after confirming that the first program has not been altered, the first CPU causes the second CPU to start up and the second CPU executes the first program stored in the first storage and verifies a presence or absence of alteration of the second program stored in the second storage, and wherein the first controller causes the third CPU to start up after confirming that the second program has not been altered.

2. The information processing apparatus according to claim 1, further comprising: a communication unit capable of communicating between the first controller and the second controller before the third CPU starts up, wherein the first controller verifies whether or not the second program has been altered based on the second program of the second storage transmitted from the second controller by the communication unit when the information processing apparatus is started up.

3. The information processing apparatus according to claim 2, wherein the communication unit enters a state in which communication between the first controller and the second controller is possible by a power of the information processing apparatus being turned on.

4. The information processing apparatus according to claim 1, wherein the first controller obtains a first hash value of the second program stored in the second storage, and uses a verification key to decrypt signature data of the second program to obtain a second hash value, and verify a presence or absence of alteration of the second program based on whether or not the first hash value matches the second hash value.

5. The information processing apparatus according to claim 1, wherein the first CPU obtains a first hash value of the second program stored in the second storage, and uses a verification key to decrypt signature data of the second program to obtain a second hash value, and verify a presence or absence of alteration of the second program based on whether or not the first hash value matches the second hash value.

6. The information processing apparatus according to claim 1, wherein the third CPU is started up by canceling a reset of the third CPU by the first controller.

7. The information processing apparatus according to claim 1, wherein the first storage comprises a flash memory.

8. The information processing apparatus according to claim 1, wherein the second storage comprises a flash memory.

9. An information processing apparatus having at least a first controller and a second controller, wherein the first controller comprises:

a first CPU;

a second CPU;

a ROM configured to store, in a non-volatile manner, a boot program that is executed by the first CPU; and a first storage configured to store, in a non-volatile manner, a first program that is executed by the second CPU, wherein the second CPU obtains a hash value of a second program stored in a second storage, and wherein the second controller comprises:

a third CPU; and the second storage configured to store, in a non-volatile manner, the second program that is executed by the third CPU, wherein, when the information processing apparatus is started up, the first CPU executes the boot program stored in the ROM to verify a presence or absence of alteration of the first program stored in the first storage, wherein after confirming that the first program has not been altered, the first CPU causes the second CPU to start up and the second CPU executes the first program stored in the first storage and verifies a presence or absence of alteration of the second program based on the obtained hash value, and wherein the first controller causes the third CPU to start up after confirming that the second program has not been altered.

10. The information processing apparatus according to claim 9, wherein the first controller verifies a presence or absence of alteration of the second program based on whether or not the obtained hash value matches a hash value obtained by decrypting signature data of the second program using a verification key.

11. The information processing apparatus according to claim 9, wherein the third CPU is started up by canceling a reset of the third CPU by the first controller.

12. The information processing apparatus according to claim 9, wherein the first storage comprises a flash memory.

13. The information processing apparatus according to claim 9, wherein the second storage comprises a flash memory.

14. An information processing apparatus having a first controller comprising a first CPU and a second CPU, and a first communication hardware module, and a second controller comprising a third CPU and a second communication hardware module, wherein when the information processing apparatus is started up, the first CPU executes a boot program to verify a first program of the second CPU, and the second CPU executes the first program which is confirmed to be valid to verify a second program to be executed by the third CPU, and the first communication hardware module communicates the first program of the second CPU to the second communication hardware module before the second CPU executes the first program, wherein the first controller causes the third CPU to start up after confirming that the second program has not been altered.

15. A method of controlling an information processing apparatus comprising at least a first controller having a first CPU, a second CPU, a ROM storing a boot program executed by the first CPU, and a first storage storing a first program that is executed by the second CPU, and a second controller having a third CPU and a second storage storing a second program to be executed by the third CPU in a non-volatile manner, the method comprising:

when the information processing apparatus is started up, executing, by the first CPU, the boot program stored in the ROM to verify a presence or absence of alteration of the first program stored in the first storage;

after confirming by the verification that the first program has not been altered, executing, by the second CPU, the first program stored in the first storage and verifying a presence or absence of alteration of the second program stored in the second storage; and causing, by the first controller, the third CPU to start up after confirming by the verification that the second program has not been altered.

16. A method of controlling an information processing apparatus comprising at least a first controller having a first CPU, a second CPU, a ROM storing a boot program executed by the first CPU and a first storage storing a first program that is executed by the second CPU, and a second controller having a third CPU and a second storage storing a second program to be executed by the third CPU in a non-volatile manner, the method comprising:
    when the information processing apparatus is started up, executing, by the first CPU, the boot program stored in the ROM to verify a presence or absence of alteration of the first program stored in the first storage;
    obtaining a hash value of the second program stored in the second storage;
    after confirming that the first program has not been altered, causing the second CPU to start up and executing, by the second CPU, the first program stored in the first storage and verifying a presence or absence of alteration of the second program based on the obtained hash value; and
    causing, by the first controller, the third CPU to start up after confirming that the second program has not been altered.

* * * * *